United States Patent
Sloan et al.

(10) Patent No.: US 9,914,355 B2
(45) Date of Patent: Mar. 13, 2018

(54) BACK-OF-CAB FUEL SYSTEM AND VEHICLE ASSEMBLIES

(71) Applicant: AGILITY FUEL SYSTEMS LLC, Santa Ana, CA (US)

(72) Inventors: Todd F. Sloan, Kelowna (CA); Chris Forsberg, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 15/499,621

(22) Filed: Apr. 27, 2017

(65) Prior Publication Data

US 2017/0313179 A1 Nov. 2, 2017

Related U.S. Application Data

(60) Provisional application No. 62/329,934, filed on Apr. 29, 2016.

(51) Int. Cl.
*B60K 15/063* (2006.01)
*B62D 35/00* (2006.01)
*B62D 33/06* (2006.01)

(52) U.S. Cl.
CPC ........... *B60K 15/063* (2013.01); *B62D 33/06* (2013.01); *B62D 35/001* (2013.01); *B62D 35/008* (2013.01); *B60K 2015/0638* (2013.01)

(58) Field of Classification Search
CPC .......... B60K 15/063; B60K 2015/0638; B62D 35/001; B62D 35/008
See application file for complete search history.

(56) References Cited

U.S. PATENT DOCUMENTS

| 8,807,256 | B2 * | 8/2014 | Gibb | F17C 1/00 180/69.5 |
| 8,950,541 | B2 * | 2/2015 | Ramberg | B62D 35/001 180/309 |
| 9,079,622 | B2 * | 7/2015 | Gan | B62D 35/001 |
| 9,085,330 | B2 * | 7/2015 | Fritts | B62D 35/001 |
| 9,284,178 | B2 * | 3/2016 | Donnelly | B67D 7/04 |
| 9,388,942 | B2 * | 7/2016 | Sloan | F17C 1/00 |
| 2011/0288738 | A1 * | 11/2011 | Donnelly | F02D 19/0697 701/99 |

(Continued)

FOREIGN PATENT DOCUMENTS

WO    WO 2015/191918    12/2015

OTHER PUBLICATIONS

Search Report and Written Opinion dated Aug. 1, 2017, in International Application No. PCT/US2017/029714.

*Primary Examiner* — Anne Marie M Boehler
*Assistant Examiner* — Michael R Stabley
(74) *Attorney, Agent, or Firm* — Knobbe Martens Olson & Bear, LLP

(57) ABSTRACT

A fuel system for a vehicle is provided. The fuel system is configured to couple to a frame rail of the vehicle. A fuel system frame assembly of the fuel system is configured to couple with the frame rail directly or with another component that is coupled, directly or indirectly, with the frame rail. A cowling of the fuel system can include a fuel pressure vessel. The fuel pressure vessel configured to be placed within and supported by the fuel system frame assembly. The fuel system is configured to enhance component arrangement efficiency when mounted to a vehicle frame rail.

13 Claims, 15 Drawing Sheets

(56) References Cited

U.S. PATENT DOCUMENTS

| | | | |
|---|---|---|---|
| 2013/0112313 A1* | 5/2013 | Donnelly | B67D 7/04 |
| | | | 141/4 |
| 2014/0061266 A1* | 3/2014 | Milton | F17C 5/06 |
| | | | 224/404 |
| 2014/0137953 A1 | 5/2014 | Gibb et al. | |
| 2016/0229286 A1* | 8/2016 | Baik | B60K 15/03519 |
| 2016/0368544 A1* | 12/2016 | Heilaneh | B62D 35/001 |
| 2017/0080798 A1* | 3/2017 | Van Der Linden | B60K 15/07 |

* cited by examiner

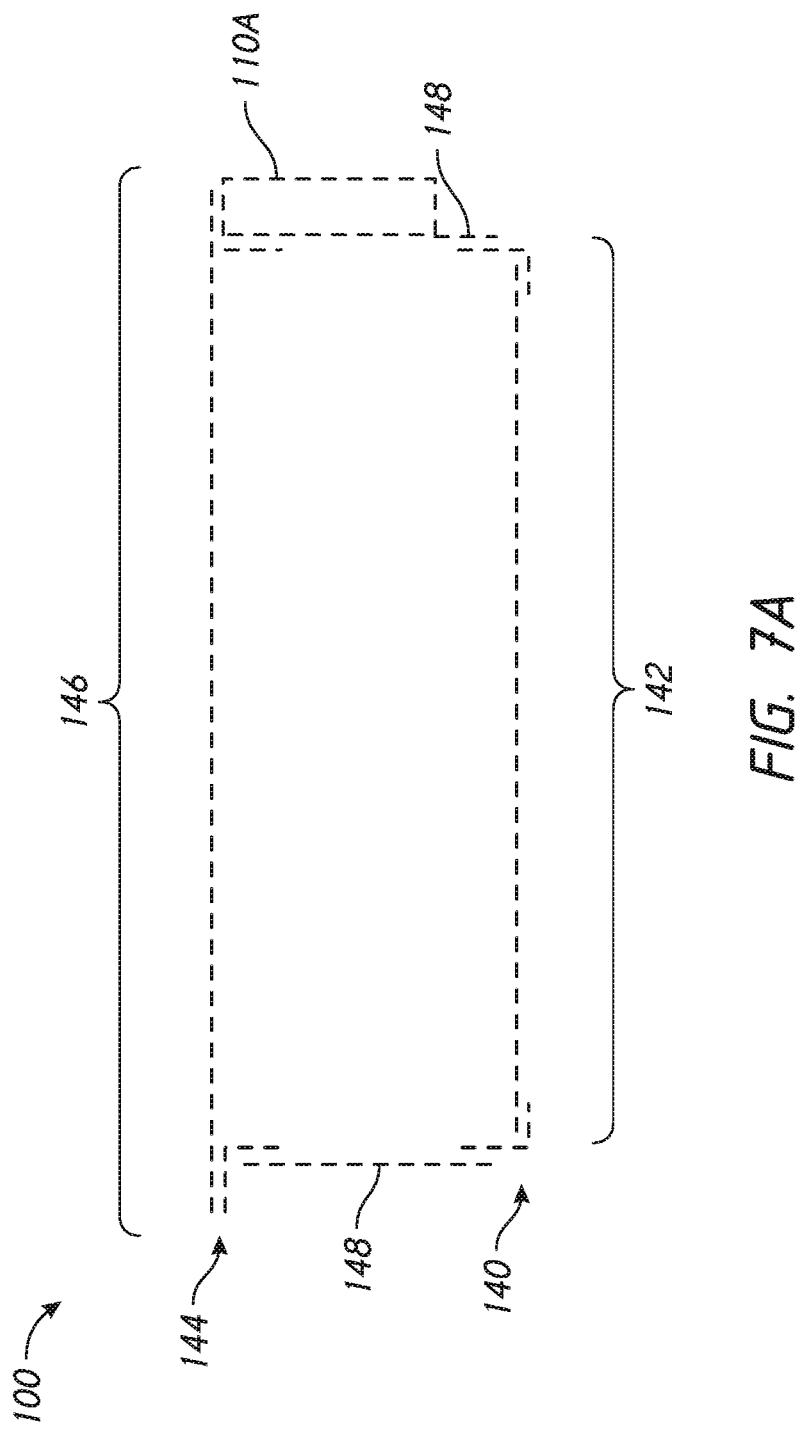

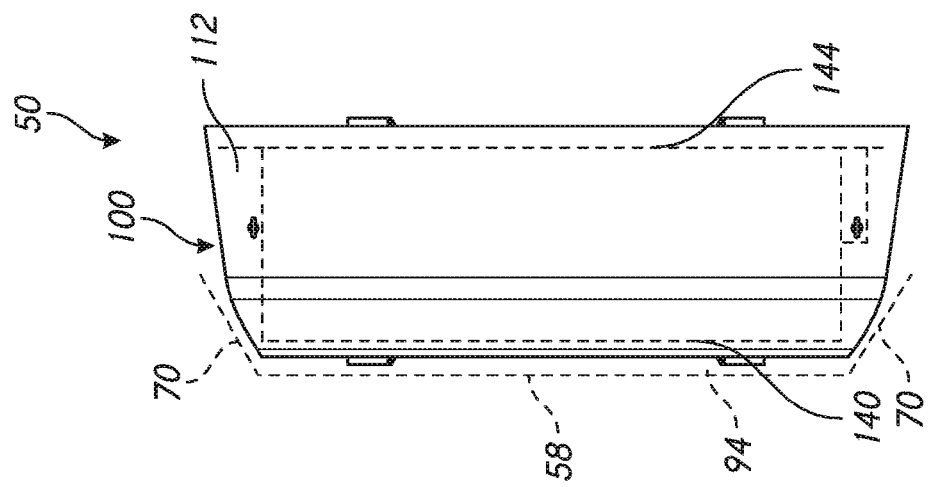
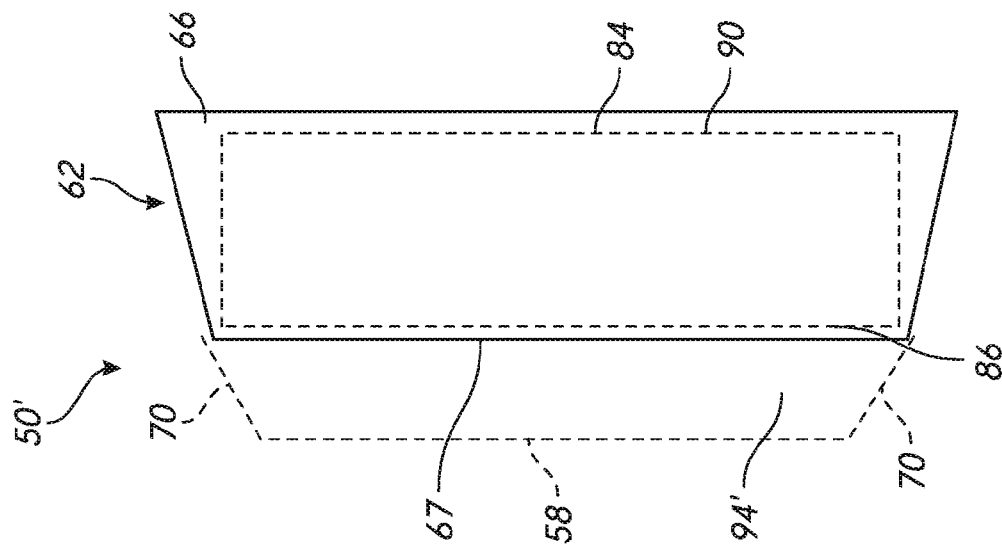

BACK-OF-CAB FUEL SYSTEM AND VEHICLE ASSEMBLIES

INCORPORATION BY REFERENCE TO ANY PRIORITY APPLICATIONS

This application claims priority to U.S. Provisional Application No. 62/329,934, filed on Apr. 29, 2016. The entire contents of the application identified above are incorporated by reference herein and made part of this specification.

BACKGROUND OF THE INVENTION

Field of the Invention

This application is directed to a fuel system that can be positioned behind the cab of a heavy duty utility vehicle such as a truck or transit vehicle.

Description of the Related Art

Fuel systems are sometimes placed behind a cab of a heavy duty utility vehicle, such as a transit vehicle or a truck. This is a common practice in configuring a vehicle to run on compressed natural gas (CNG). CNG fuel systems have traditionally been spaced an inefficient amount from a rear portion of the cab of the vehicle. There are several reasons for this practice. A CNG powered vehicle is expected to provide a minimum diesel gallon equivalent (DGE) fuel capacity such that the vehicle can operate as much as possible like a conventional diesel powered truck while providing all the benefits of CNG. One technique for providing sufficient fuel capacity is to keep the tanks as wide as possible without greatly extending beyond the width of the cab. Also, cabs are fitted with fairings that extend outwardly and rearward of the back of the cab. The fairings provide a more aerodynamic profile, but encroach upon the space immediately aft of the cab where the fuel system would ideally be positioned to minimize wheelbase implications. The fairings thereby can limit the volume of space available for placing a back-of-cab system.

SUMMARY OF THE INVENTION

In the past, back-of-cab fuel systems providing optimal fuel capacities were often too wide to fit well within the space adjacent to the cab backwall, e.g., to be disposed within the area of the fairings. As a result, a certain amount of empty space was left unused between the cab and the fuel system. As part of the inventions herein there was the realization that the fuel system should be configured in a way to make the best use of the space on the frame rail, by enabling a back-of-cab fuel system to be positioned closer to the cab. It was realized that if the unused space between the cab and the front of the fuel system could be reduced or eliminated, a more compact arrangement would result. These more compact arrangements would have a number of advantages, such as enabling other components to be mounted on a frame rail without lengthening the rail or wheelbase. These more compact arrangements also would allow shortening the wheel base of the tractor unit. A shorter wheel base vehicle would be lighter and would have a tighter turning radius, among other benefits.

In one embodiment, a vehicle assembly is provided that includes a frame rail, a cab, an aerodynamics package including a roof fairing and side extenders, and a fuel system. The frame rail extends between a front axle and a rear axle of the vehicle assembly. The cab is supported by the frame rail and has a driver side, a passenger side, and a back wall at least partially enclosing an interior space of the cab. The fairing is coupled with the cab. The fairing has a rear portion disposed laterally of the passenger side and the driver side. The rear portion of the fairing also is disposed above the top portion of the cab. The fairing partially surrounding a tapered space disposed rearward of the back wall of the cab. The fuel system has a fuel system frame, at least one fuel pressure vessel, and a cowling. The fuel system frame has a bottom portion coupled with the frame rail and an internal space extending away from the bottom portion toward a top portion. The one or more fuel pressure vessel(s) is at least partially disposed in the internal space and is supported by the fuel system frame. The cowling is disposed around the fuel system frame. The cowling has a forward portion and a rearward portion. The cowling has a tapered profile in a horizontal plane of the cowling. The tapered profile has a rearward taper and a forward taper. The forward taper extends between the rearward taper and a forward end of the tapered profile. The forward taper and at least a portion of the rearward taper are disposed in the tapered space.

In another embodiment, a vehicle assembly is provided that includes a frame rail, a cab, an aerodynamics package including a roof fairing and side extenders, and a fuel system. The frame rail extends between a front axle and a rear axle of the vehicle assembly. The cab is supported by the frame rail and has a driver side, a passenger side, and a back wall. The back wall at least partially encloses an interior space of the cab. The fairing is coupled with the cab. The fairing has a rear portion disposed laterally of the passenger side and the driver side. The rear portion of the fairing is disposed above the top portion of the cab. The rear portion of the fairing partially surrounding a tapered space disposed rearward of the back wall of the cab. The fuel system has a fuel system frame, at least one fuel pressure vessel, and a cowling. The fuel system frame has a bottom portion coupled with the frame rail and an internal space extending away from the bottom portion toward a top portion. The fuel system frame is narrower toward a forward portion thereof than adjacent to a rear portion thereof. The at least one fuel pressure vessel is at least partially disposed in the internal space and is supported by the fuel system frame. The cowling is disposed around the fuel system frame. The cowling has a forward portion and a rearward portion. The cowling encloses the fuel system frame and is narrower toward a forward portion thereof than adjacent to a rearward portion thereof. The fuel system is supported by the frame rail adjacent to the back wall of the cab.

In another embodiment, a fuel system is provided that includes a frame assembly, a fuel pressure vessel, and a cowling. The frame assembly is disposed around an internal space and configured to be coupled with a vehicle frame rail. The frame assembly has a first frame that has a first maximum width and a second frame that has a second maximum width. The first frame is disposed forward of the second frame. The first maximum width is less than the second maximum width. The fuel pressure vessel has a cylindrical portion that extends between the ends thereof and that is disposed along a longitudinal axis of the fuel pressure vessel. The cylindrical portion is disposed in the internal space of the frame assembly. The cowling is disposed around the frame assembly. The cowling has a cowling tapered width at the location of the first frame. The cowling tapered width is less than the second maximum width of the second frame of the frame assembly.

In another embodiment, a fuel system frame assembly is provided. The fuel system frame assembly has a first frame, a second frame, a first connector, and a second connector. The first frame has a first maximum width. The second frame has a second maximum width greater than the first maximum width. The second frame is disposed rearward of the first frame. The first connector has a forward end coupled with the first frame and a rearward end coupled with the second frame. The second connector has a forward end coupled with the first frame and a rearward end coupled with the second frame. The first and second connectors are disposed on opposite lateral sides of the fuel system frame assembly. An internal space is disposed between the first frame and the second frame and between the first connector and the second connector. The internal space is sized to house a cylindrical portion of a vehicle fuel pressure vessel. The fuel system frame assembly also has a fuel pressure vessel neck support coupled with each of the first connector and the second connector. The fuel system frame assembly is configured to be mounted to a vehicle frame rail of a tractor unit behind a cab of the tractor unit.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 7A is a top side schematic view of an embodiment of a frame assembly configured for the fuel system of FIG. 3;

FIGS. 9A and 9B are schematic views illustrating how the fuel system of FIGS. 3-7 can be advantageously integrated into a vehicle assembly.

DETAILED DESCRIPTION OF THE PREFERRED EMBODIMENT

Figure 1:
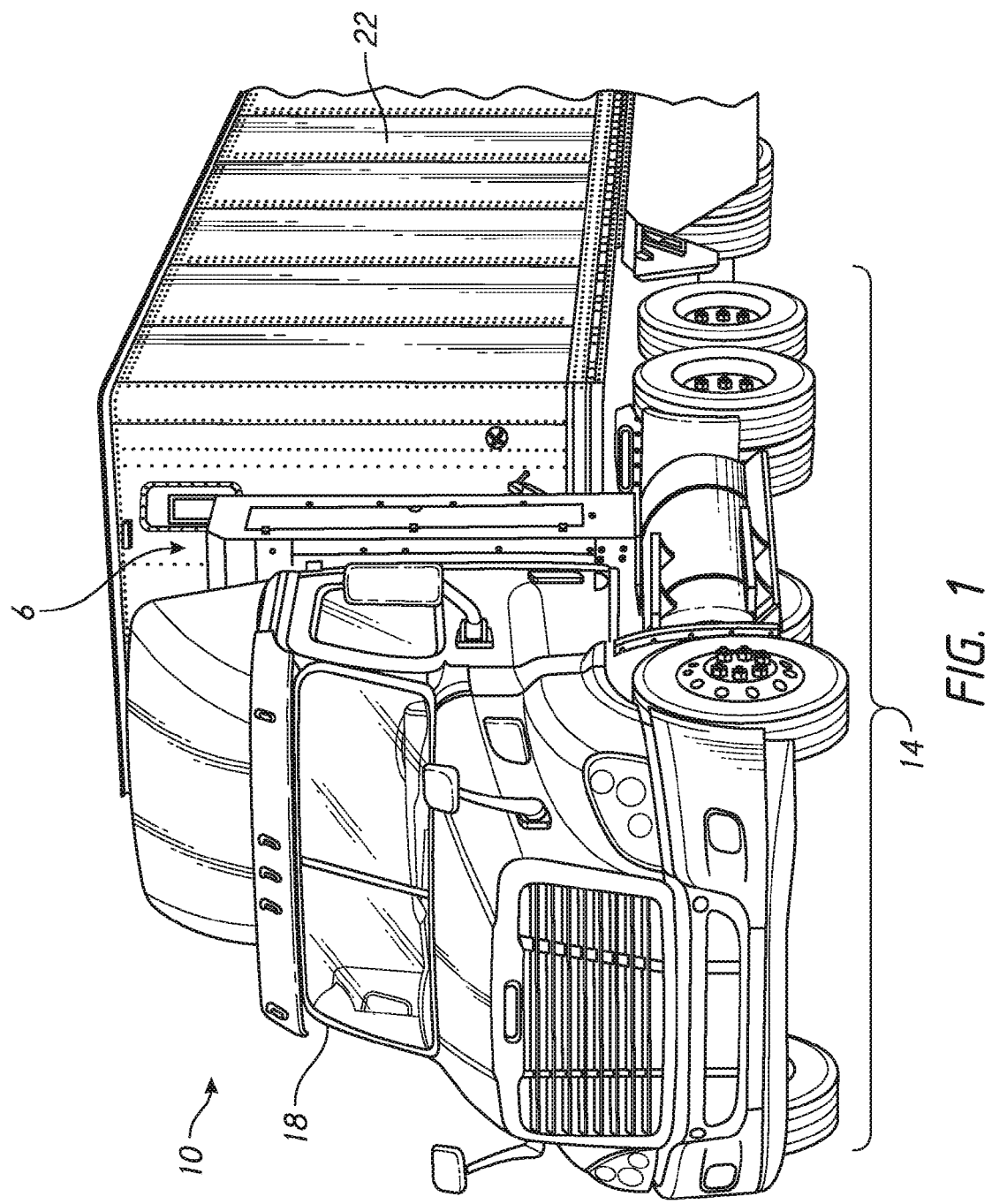
FIG. 1 is a perspective view of a heavy duty truck with a back-of-cab fuel system.

This application is directed to techniques to enhance the arrangement of a fuel system 6 and in some embodiments other components of a heavy duty truck, e.g., onto a tractor unit 14 of a truck 10. FIG. 1 shows that the fuel system 6 disposed between a cab 18 and a semi-trailer unit 22. Improvements are discussed that enable the fuel system 6 to be placed closer to a back wall of the cab 18 when integrated onto a vehicle with an aerodynamics package than had previously been known. As a result, wasted space between the cab 18 and the fuel system 6 can be reduced. This improved arrangement provides a number of advantages, including reducing weight and/or increasing configurability of a frame rail and/or reducing turning radius of the tractor unit 14 and a truck with which it is coupled and further advantages discussed herein.

Figure 2A:
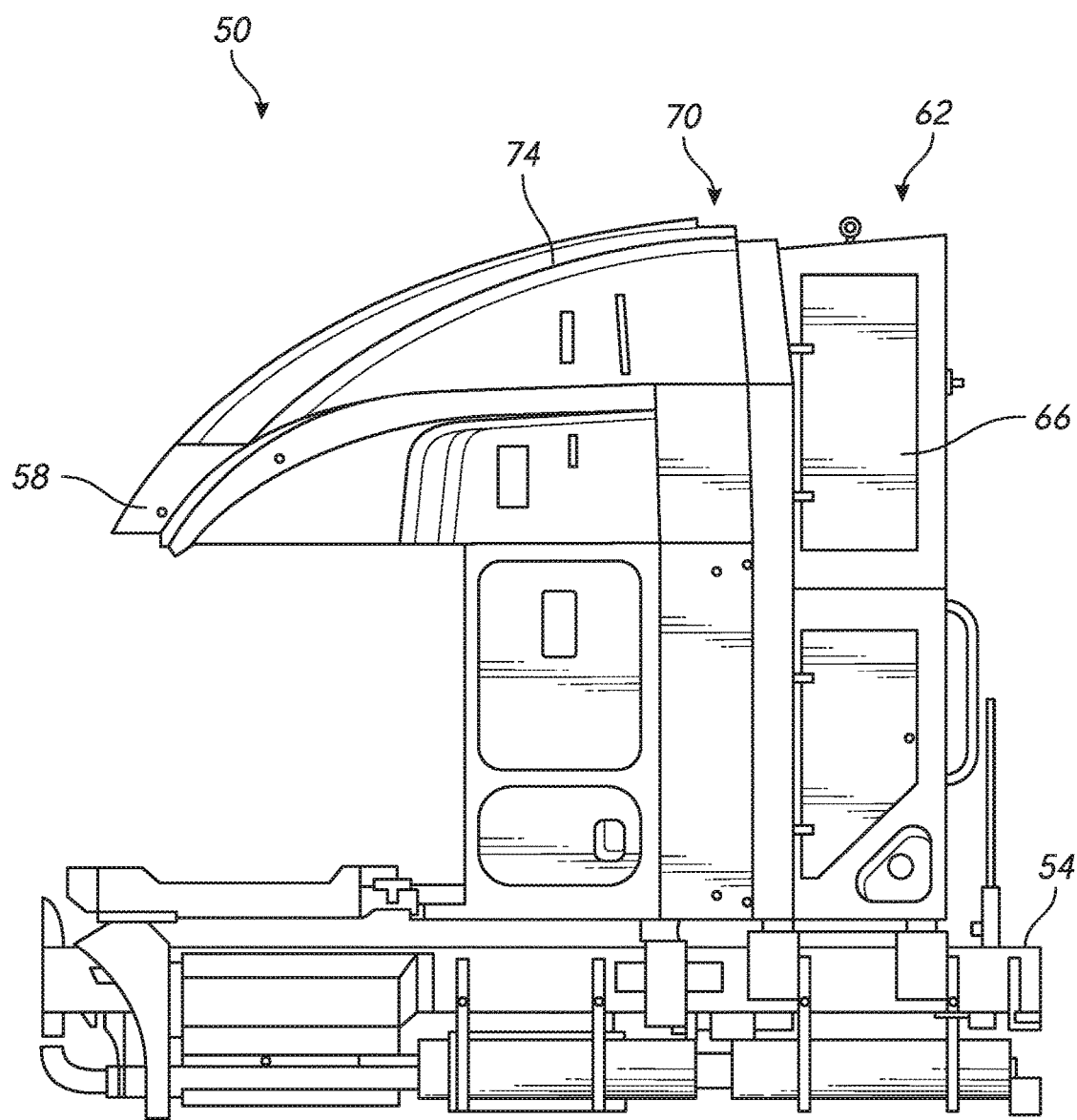
FIG. 2A is a side view of a fragmented view of tractor unit assembly showing a frame rail, a cab assembly, and a fuel assembly, the fuel assembly having a tapered cowling.
Figure 2B:
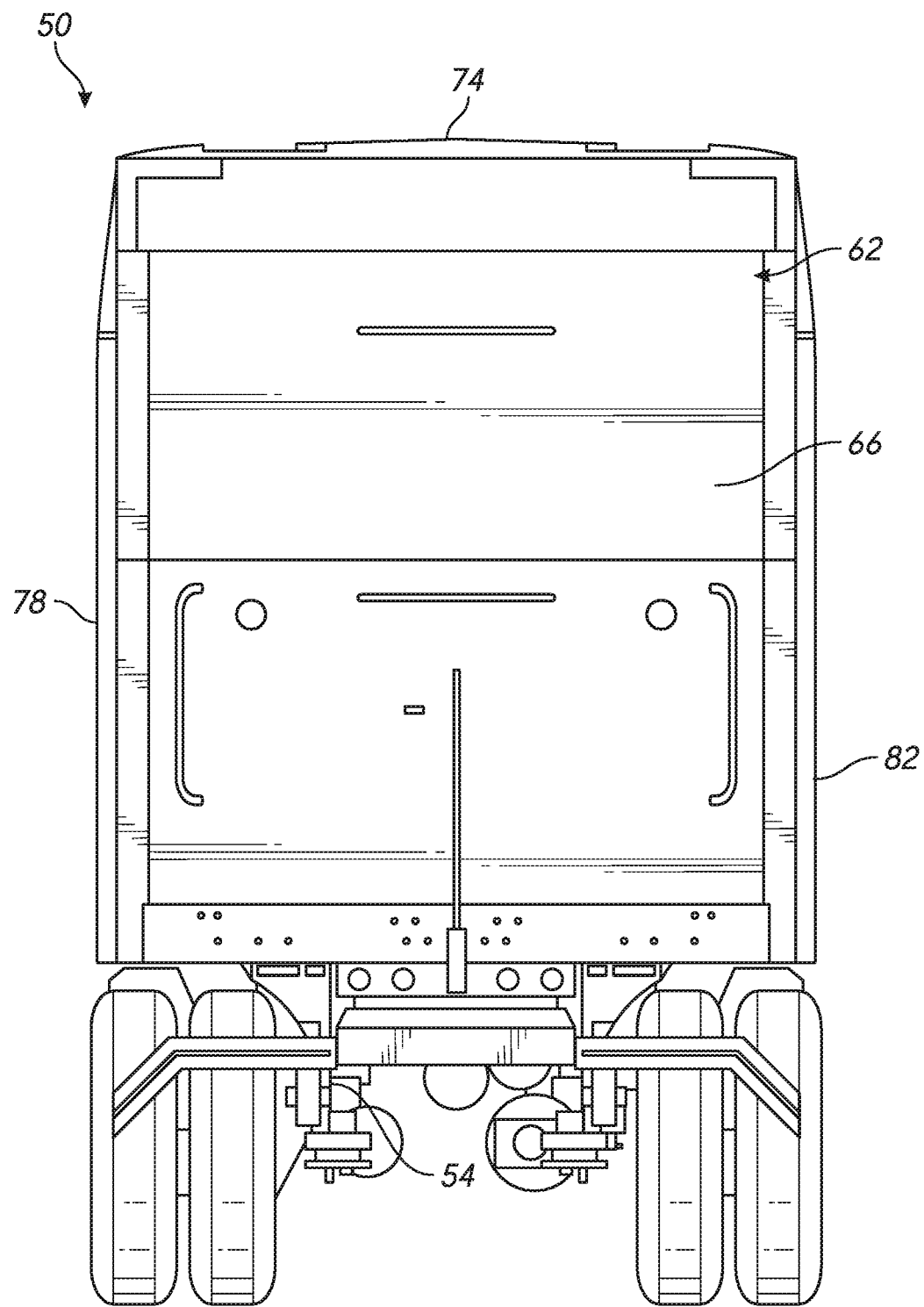
FIG. 2B is a rear view of the tractor unit assembly of FIG. 2A, further illustrating the position of the fuel system in relation to the rear wheels.

FIGS. 2A and 2B show an example embodiment of a vehicle assembly 50 that includes a frame rail 54 and a cab 58 supported thereby. A fuel system 62 is disposed rearward of, or behind, the cab 58. The fuel system 62 is an example of a behind-the-cab system. The system 62 has a tapered profile in that a cowling 66 thereof has a transverse perimeter that reduces in the forward direction. The taper of the perimeter allows a forward portion to be received to some extent into a tapered space surrounded by a fairing 70. The fairing 70 primarily improves the aerodynamics of the vehicle assembly 50. The fairing 70 can be configured as a unitary component that surrounds one, two or three sides of the cab 58 or can include multiple portions. A top fairing portion 74 can be coupled with a roof of the cab 58. The top fairing portion 74 can flare upward and rearward of the cab 58. One or more side portions 78 can extend from a driver side of the cab 58. One or more side portions 82 can extend from a passenger side of the cab 58. Although some degree of tapering is provided in the cowling 66 of the fuel system 62 other embodiments herein further enhance component arrangement as discussed further below.

FIGS. 3-7C illustrate a fuel system 100 that is configured for enhanced component arrangements on the frame rail 54. In various embodiments discussed below, an exterior of the fuel system 100 includes at least two tapered portions. In some cases, the taper angle adjacent a forward portion of the exterior of the fuel system 100 is greater than the taper adjacent to the rearward portion thereof. In some cases, an interior frame structure is configured to accommodate a plurality of exterior taper portions or is configured to enable a forward portion to have a greater taper than a rearward portion.

Figure 7:
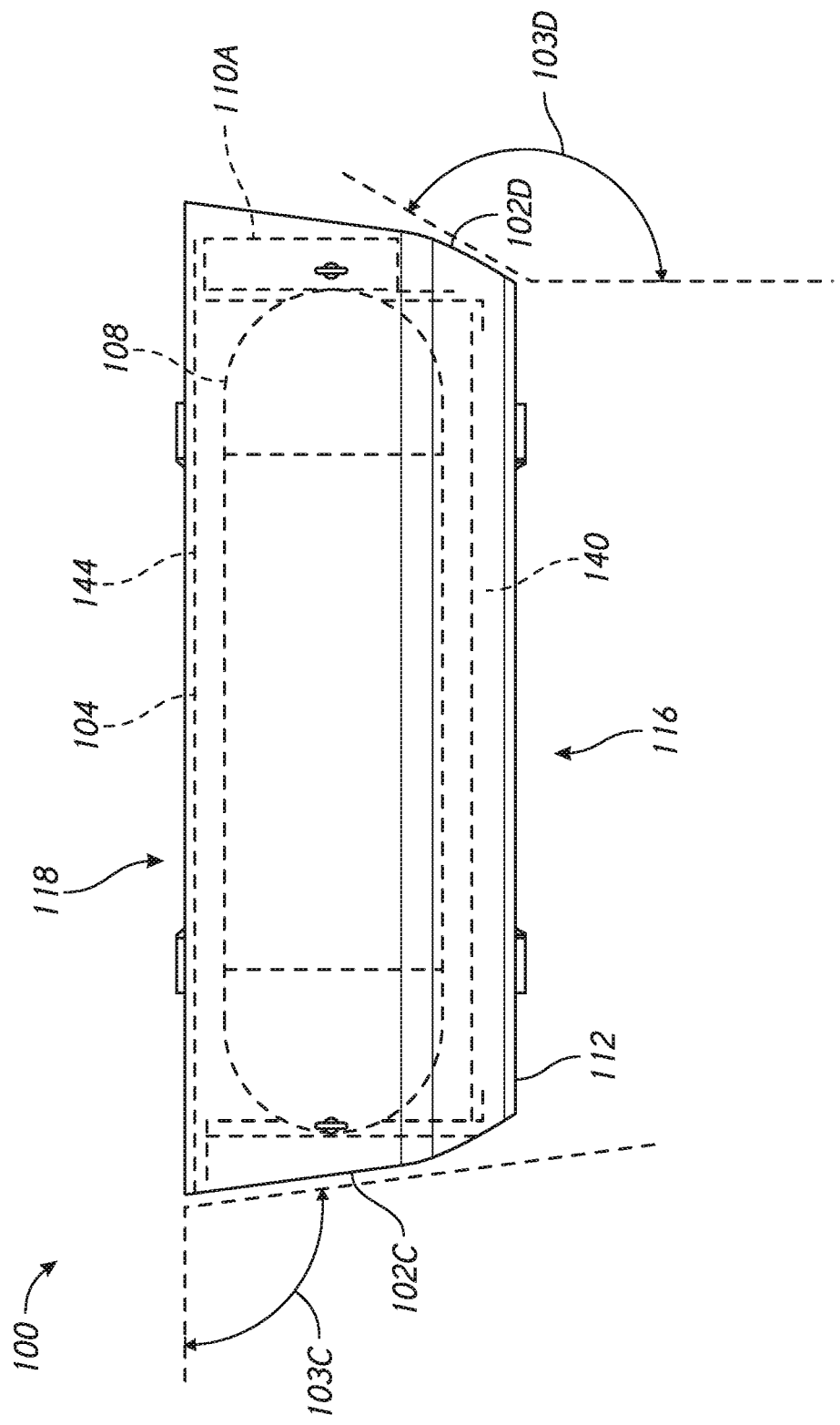
FIG. 7 is a top side of the fuel system of FIG. 3.

The fuel system 100 includes a frame assembly 104 (see FIGS. 7-7C), a fuel pressure vessel 108 (see FIGS. 4, 4A, and 7), and a cowling 112. The frame assembly 104 is disposed around an internal space to house pressure vessels 108 and other components. The frame assembly 104 is configured to be coupled with a vehicle frame rail. As shown in FIG. 7A and as discussed further below, the frame assembly 104 has a first maximum width 142 and a second maximum width 146. In a configuration for enhancing the close-packing of the fuel system 100 with a tractor unit cab, the first maximum width 142 is located forward of the second maximum width 146 and is less than the second maximum width. The fuel pressure vessel 108 has a cylindrical portion that extends between the ends thereof and that is disposed along a longitudinal axis of the fuel pressure vessel. The cylindrical portion is disposed in the internal space of the frame assembly 104. The cowling 112 is disposed around the frame assembly 104. The cowling 112 has a forward tapered portion 113 at the location of the first frame maximum width 142. The forward tapered portion 113 of the cowling 112 has a width that is less than the second maximum width 146 of the frame assembly 104. A rearward tapered portion 115 is located between the forward tapered portion 113 and a rear side of the cowling 112.

Figure 7B:
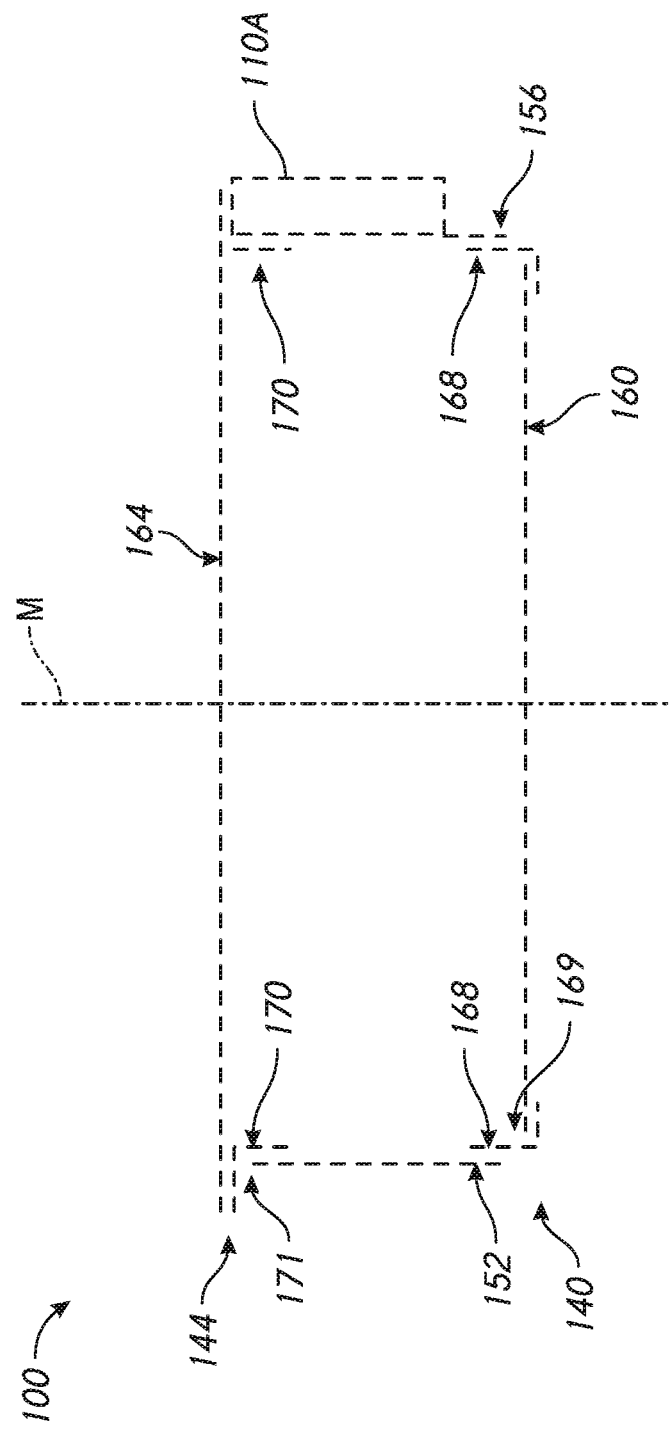
FIG. 7B is a top side schematic view of an embodiment of a frame assembly configured for the fuel system of FIG. 3.
Figure 7C:
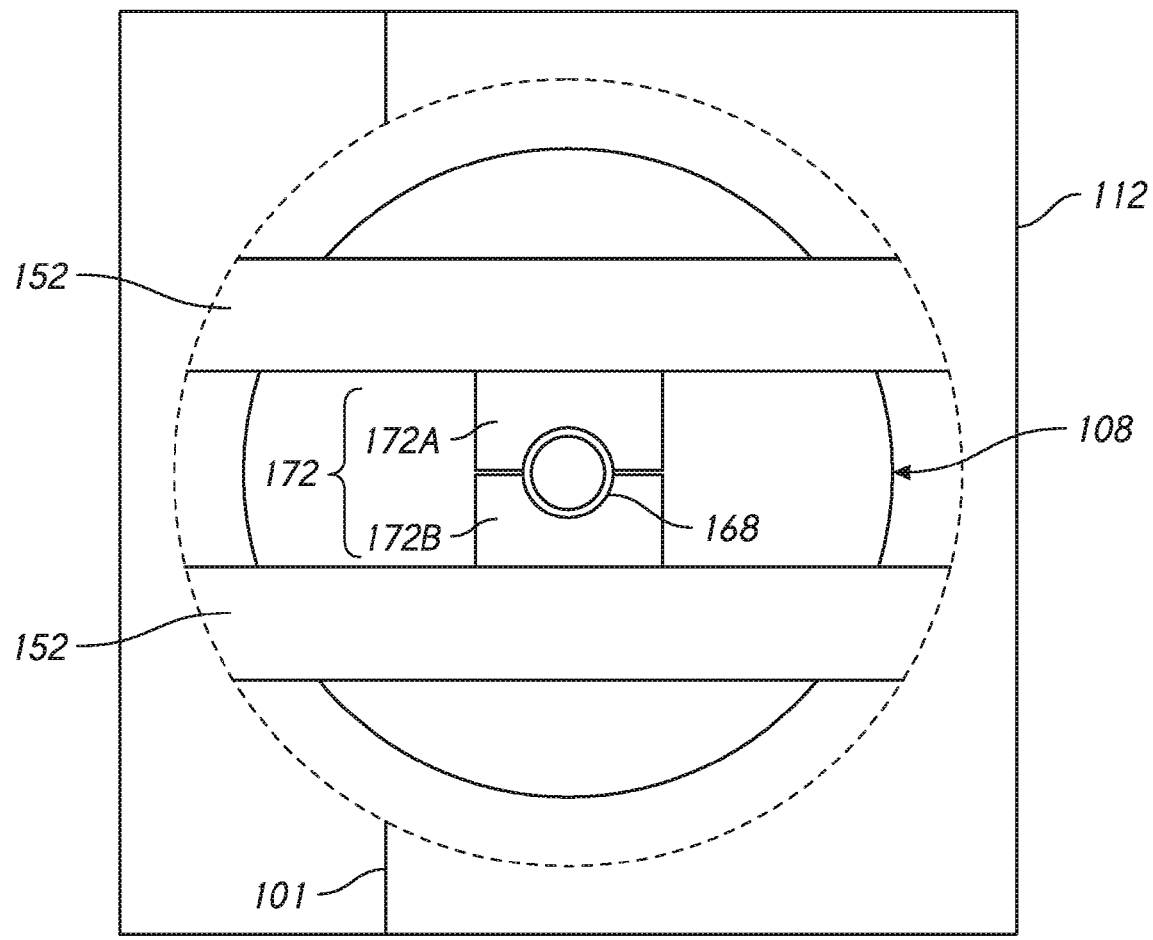
FIG. 7C is a detailed side view with a portion of the cowling removed showing a neck mount assembly for a fuel pressure vessel.

FIGS. 7-7C shows an embodiment in which the fuel system frame assembly 104 has a first frame 140 and a second frame 144. As described herein, the fuel system 100 can have one or more fuel pressure vessels 108 and an access panel 110. The access panel 110 can be disposed adjacent to a lateral side of the fuel system 100. An access panel support portion 110A can be provided on the frame assembly 104 for coupling valves and ports as appropriate. The access panel 110 can be configured such that the fuel pressure vessels 108 can be filled or re-filled through the access panel 110.

Figure 6:
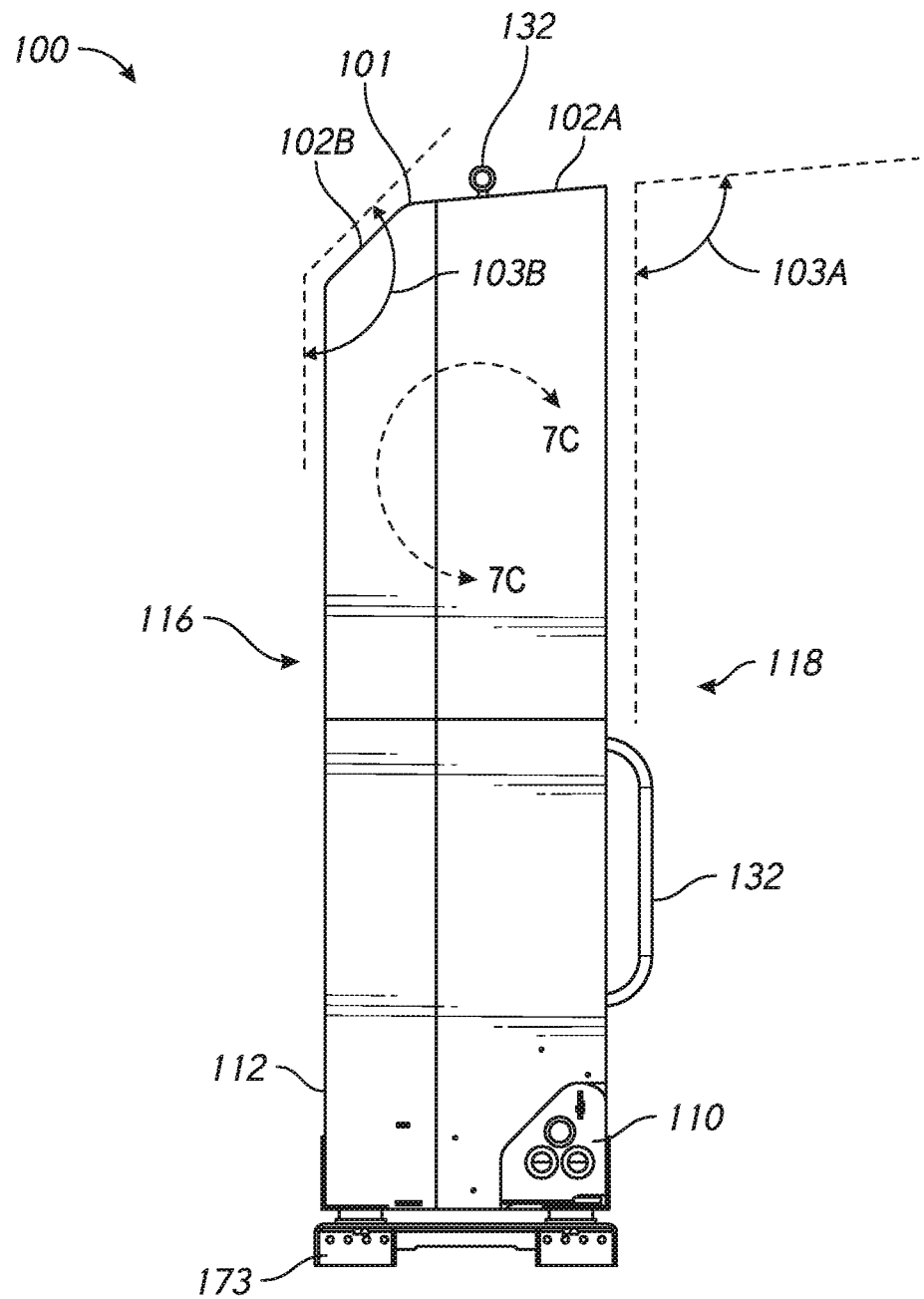
FIG. 6 is a driver side view of the fuel system of FIG. 3.

FIG. 6 shows that the fuel system 100 can have a plurality of tapers, e.g., can have a dual-tapered configuration in side profile. A dual-tapered system can include a first tapered portion 102A on a top portion and a second tapered portion 102B on the top portion. The first tapered portion 102A can be disposed rearward from the second tapered portion 102B. In this embodiment, the first tapered portion 102A can taper at a first angle 103A from the rearward portion 118 toward the forward portion 116 of the cowling 112. The second tapered portion 102B can taper at a second angle 103B from the forward portion 116 toward the rearward portion 118 of the cowling 112. The first angle 103A can be greater than, less than, and/or equal to the second angle 103B. In some embodiments, the first angle 103A is about 90°. In some embodiments, the first angle 103A is about 95°, 100°, 105°, 110°, 115°, 120°, 125°, 130°, 135°, 140°, 145°, 150°, 155°, 160°, 165°, 170°, 175°, and/or 180°. In some embodiments, the second angle 103B is about 95°, 100°, 105°, 110°, 115°, 120°, 125°, 130°, 135°, 140°, 145°, 150°, 155°, 160°, 165°, 170°, 175°, and/or 180°.

As illustrated in FIG. 7, a dual-tapered system can include a third tapered portion 102C and fourth tapered portion 102D. In this embodiment, the forward tapered portion 102C can taper inwardly at a first angle 103C from the rearward portion 118 toward the forward portion 116 of the cowling 112. The fourth tapered portion 102D can taper inwardly at a second angle 103D from the rearward portion 118 toward the forward portion 116 of the cowling 112. The first angle 103C can be greater than, less than, and/or equal to the second angle 103D. In some embodiments, the first angle 103C is about 90°. In some embodiments, the first angle 103C is about 95°, 100°, 105°, 110°, 115°, 120°, 125°, 130°, 135°, 140°, 145°, 150°, 155°, 160°, 165°, 170°, 175°, and/or 180°. In some embodiments, the second angle 103D is about 95°, 100°, 105°, 110°, 115°, 120°, 125°, 130°, 135°, 140°, 145°, 150°, 155°, 160°, 165°, 170°, 175°, and/or 180°.

FIG. 7A illustrates a schematic view of one embodiment of the fuel system frame assembly 104. The second frame 144 can be disposed rearward of the first frame 140. In some embodiments, the second frame 144 can be disposed at a rear planar side of the frame assembly 104. The first frame 140 can be disposed at a front planar side of the frame assembly 104. The frame assembly 104 includes one or more connectors 148 to couple the first frame 140 to the second frame 144. The connectors 148 can be plate-like members or can be angled or C-shaped members. FIG. 7C shows that in some embodiments, the frame assembly 104 includes a plurality of connector 148 on one or each lateral side of the frame assembly 104. The first frame 140 can have a first maximum width 142 as discussed above. The second frame 144 can have a second maximum width 146 as discussed above. In this configuration, the first maximum width 142 can be less than the second maximum width 146 to provide a number of benefits as discussed herein. For example, the reduced dimension at the front frame 140 enables the cowling 112 to be shaped around the frame assembly 104 in a manner that enables the fuel system 100 to be moved closer to a cab of a tractor unit on a vehicle.

FIG. 7B illustrates a schematic view of one embodiment of the frame assembly 104 in more detail. The connectors 148 can include first and second lateral connectors 152, 156. The second lateral connector 156 can be disposed on a side of the frame assembly corresponding to the driver side of the frame assembly 104. The first lateral connector 152 can be disposed on an opposite lateral side of the frame assembly 104, e.g., a side corresponding to a rider side of a tractor unit. At least one of the transverse connectors is disposed on the forward side of the frame assembly 104 configured to be disposed adjacent to the rear of the cab. A transverse connector 160 can be part of the first frame 140. Another transverse connector can be disposed on the rearward side of the frame assembly 104. A transverse connector 164 can be part of the second frame 144.

In the illustrated embodiment, the first and second lateral connectors 152, 156 comprise a plate-like structure. The first and second transverse connectors 160, 164 can comprise a plate-like structure in some embodiments. In some embodiments, the first and second transverse connectors 160, 164 can extend longitudinally between first and second L-brackets 168, 170. The first and second L-brackets 168, 170 can form a coupling mechanism that is configured to connect the lateral connectors to the transverse connectors. The first and second L-brackets 168, 170 can be mounted and/or coupled to a front-facing side of the transverse connector 160. The brackets 168, 170 and the transverse connector 160 form at least a portion of the first frame 140 in some embodiments. In another embodiment one or each of the brackets 168, 170 is mounted to a rear facing side of the transverse connector 160. The lateral connectors 152, 156 can be coupled with lateral sides of the L-brackets 168, 170 in one embodiment. In another embodiment, one or both of the L-brackets 168, 170 can be coupled with a medial side of one or both of the lateral connectors 152, 156. In this context, the medial sides are the sides facing the mid-plane M of the frame assembly 104. In other embodiments, the first and second L-brackets 168, 170 can be partially mounted and/or coupled to lateral surfaces of the lateral connectors 152, 156 and the transverse connectors 160, 164 and partially mounted and/or coupled to medial surfaces of the lateral connectors 152, 156 and the transverse connectors 160, 164.

The first and second L-brackets 168, 170 can have the same or different configurations. The first and second L-brackets 168, 170 can be disposed in the same or different orientations. In some embodiments, the first and second L-brackets 168, 170 can have the same configuration but be disposed in different orientations. For example, the first L-bracket 168 can comprise a first concave portion 169. The first concave portion 169 can be disposed in a configuration such that it faces an interior of the frame assembly 104. The first concave portion 169 can be configured to receive and/or be coupled with one or more connectors, e.g., with the transverse connector 160. In this configuration, an interior facing surface of the first L-bracket 168 can be mounted to an exterior facing surface of the transverse connector 160. An exterior facing surface of the first L-bracket 168 can be mounted to an interior facing surface of one or both of the first and second lateral connectors 152, 156.

In some embodiments, the second L-bracket 170 can comprise a second concave portion 171. The second concave portion 171 can be disposed in a configuration such that it faces away from the interior of the frame assembly 104. The second concave portion 171 can be configured to receive one or more connectors. In one configuration, exterior facing surfaces of the concave portions 171 of the second L-bracket 170 can be mounted to an interior facing surface of the first and second lateral connectors 152, 156. An exterior facing surface of another portion of the second L-bracket 170 can be mounted to an interior facing surface of the second transverse connector 164.

The first and second L-brackets 168, 170 can help to reinforce and/or strengthen the structure of the frame assembly 104. In some embodiments, the L-brackets 168 support the first and second frames of the fuel system frame assembly 104 directly or indirectly on one or a plurality of frame rail brackets 173.

In some embodiments, the first lateral connector 152 can have a forward end and a rearward end. The forward end of the first lateral connector 152 can be coupled with the first frame 140 and the rearward end of the first lateral connector 152 can be coupled with the second frame 144. In this example, the second lateral connector 156 can have a forward end and a rearward end. The forward end of the second lateral connector 156 can be coupled with the first frame 140 and the rearward end of the second lateral connector 156 can be coupled with the second frame 144. In this configuration, the first and second lateral connectors 152, 156 can be disposed on opposite lateral sides of the fuel system frame assembly 104.

In some embodiments, the fuel system frame assembly 104 can comprise a plurality of lateral connectors 148 disposed on opposite sides of the fuel system frame assembly 104. For example, each lateral connector of the plurality of lateral connectors can be spaced vertically to form sides of the fuel system frame assembly 104. FIG. 7C shows two lateral connectors 148 in a vertical arrangement. The lateral connectors 148 can also be configured to support other components, such as neck portions of the fuel pressure vessels 108 as discussed further below. In another example embodiment, the lateral connector can form a substantially solid plate extending vertically to form sides of the fuel system frame assembly 104.

The first frame 140 and the second frame 144 can be located such that an internal space is disposed between the first frame 140 and the second frame 144 and between the first lateral connector 152 and the second lateral connector 156. The internal space can be sized to house a cylindrical portion of at least one vehicle fuel pressure vessel 108.

Figure 4:
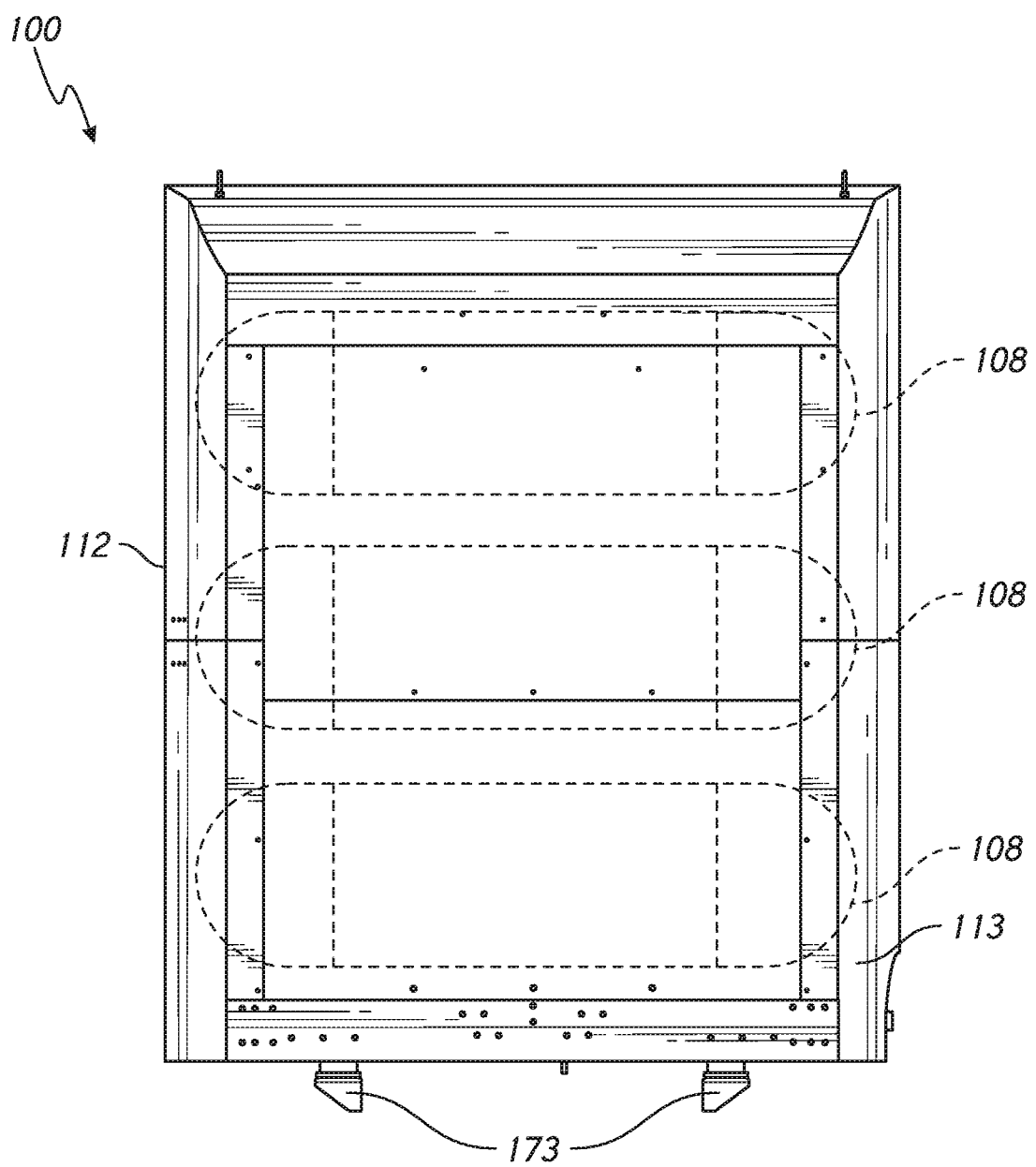
FIG. 4 is a front view of the fuel system of FIG. 3, showing a location of three pressure vessels in dash lines.
Figure 4A:
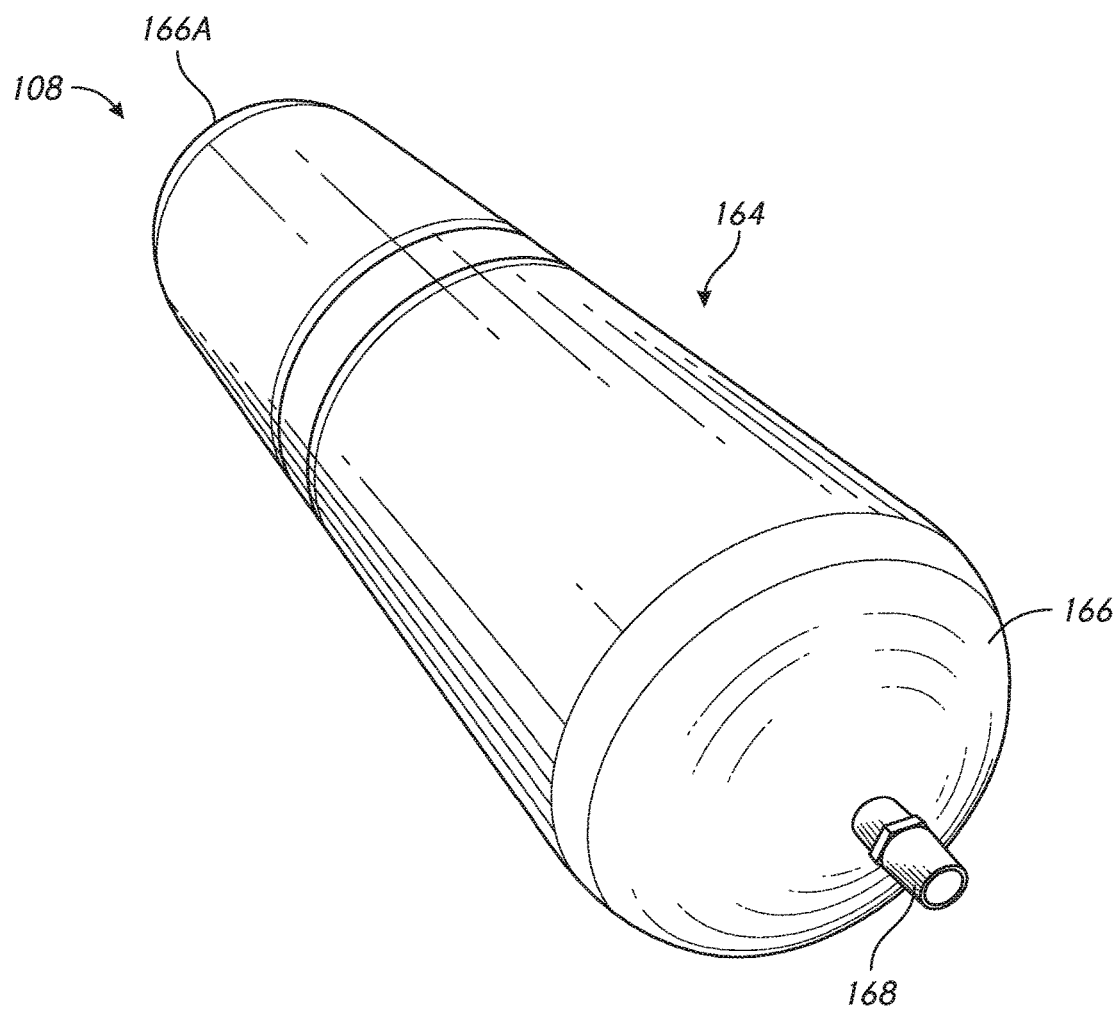
FIG. 4A includes lateral perspective views of a fuel pressure vessel that can be incorporated into the fuel system as illustrated in FIG. 4.

FIG. 4A shows that in one embodiment the fuel pressure vessel 108 can comprise a cylindrical portion 164 and an end portion 166 including a boss 168. An end portion 166A opposite the boss 168 can include a second boss. The end portion 166, 166A can also include one or more bleed or fill ports.

In some embodiments, the fuel pressure vessel 108 can be mounted to the frame assembly 104. As shown in FIG. 7C (a cross-sectional side view of the fuel system 100 illustrated in FIG. 6), the lateral connectors of the fuel system frame assembly 104 can comprise one or more fuel pressure vessel supports 172. The fuel pressure vessel supports 172 are configured to receive and retain the boss 168 (See FIG. 8) of the fuel pressure vessel 108. For example, in one embodiment, a mounting block assembly is provided in which a first block 172A is configured to support the boss 168 of the end portion 166 from beneath. The first block 172A can have a semi-cylindrical surface upon which a lower portion of the boss 168 rests in a free state. The block assembly can have a second block 172B that is placed over the boss 168 to cover the boss. For example, the second block 172B can have a semi-cylindrical surface that can be disposed over a top surface of the boss 168. The first and second blocks 172A, 172B of the block assembly can form a cylindrical surface that surrounds the boss 168. The first block 172A can be secured to one of the first lateral connectors 152. The second block 172B can be secured to another one of the second lateral connectors 152 directly above the other first lateral member 152 to which the first block 172A is secured. The block assembly enables the lateral members 152 to indirectly support the boss 168 and thereby the fuel pressure vessel 108.

In one embodiment, a block assembly is used to support the end portion 166 and a block assembly is used to support the end portion 166A opposite the end portion 166. The end portion 166A will usually be supported in the fuel system 100 adjacent to the location of the access panel 110 of the cowling 112. This allows a user to access fill and bleed ports of the fuel pressure vessel 108 as needed. The ports can be directly accessed or can be in fluid communication with a fuel line that is remote from the ports. This would permit the pressure vessel 108 to be mounted in the opposite orientation such that the ports are not close to or accessible through the panel 110.

The block assembly, as described herein, can have several advantages. The block assembly can support the neck and/or boss 168 of the end portion 166 of the fuel pressure vessel 108 without loosening or stretching. For example, in some embodiments, the fuel pressure vessel 108 can comprise a polymer material. In such embodiments, the polymer can expand or compress due to the internal pressure of the CNG and/or internal or external temperature applied to the fuel pressure vessel 108, among other factors. As the cylindrical portion 164 expands and compresses, the overall shape and size of the block assembly can remain the same since the block assembly supports the boss 168 and/or neck of the fuel pressure vessel 108. Accordingly, the materials used for the block assembly may require replacement less frequently. Thus, the cost of supporting the fuel pressure vessel 108 within the fuel system frame assembly 104 may be less expensive.

In some embodiments, the block assembly can help to maintain the compact configuration of the fuel pressure vessel 108 disposed within the fuel system frame assembly 104. For example, the boss 168 of the fuel pressure vessel 108 may extend outwardly beyond an outer perimeter formed by the frame assembly 104. The block assembly can create a flat portion to enclose and support the fuel pressure vessel without the boss 168 hitting or abutting the interior of the cowling 112 that surrounds the fuel system frame assembly 104. In some embodiments, the block assembly can provide a compact arrangement for supporting the fuel pressure vessel 108 within the fuel system frame assembly 104. For example, the block assembly can be configured to enable the fuel pressure vessel 108 and its components to be recessed within lateral sides of the frame assembly 104. In this configuration, the block assembly can extend away from the lateral connectors of the fuel system frame assembly 104 towards the mid-plane M of the frame assembly 104. A recessed configuration can allow the fuel pressure vessel components to be at least partially inward of a plane of the lateral sides of the fuel system frame assembly 104. Accordingly, the recessed configuration can help to reduce the overall width of the fuel system 100. Reduced width can contribute to weight reduction and to aerodynamic drag reduction.

The mounting assembly for supporting the fuel pressure vessel 108 can include a belt assembly. The belt assembly can comprise one or more belts. The one or more belts can surround and/or support the fuel pressure vessel 108 by surrounding the cylindrical portion 164 such that the cylindrical portion can sit within the one or more belts. In this configuration, the one or more belts can be connected to a transverse connector. In some embodiments, the one or more belts can be supported by and/or hang from another transverse beam extending from one lateral connector to an opposite lateral connector. In yet other embodiments, the one or more belts can be connected to one or more lateral connectors. The belt can be made of steel and/or a polymer, for example.

The fuel pressure vessels 108 can be mounted to the fuel system frame assembly 108 in a compact array. As discussed above, the fuel system frame assembly 104 can have a plurality of fuel pressure vessel supports 172 on each of the lateral connectors 152, 156 to support a plurality of fuel pressure vessels in a compact array. FIG. 4 illustrates that the compact array can include a vertically oriented array. The vertically oriented array can include providing a plurality of, e.g., three, fuel pressure vessels 108 aligned in a vertical plane. In one instance, the central longitudinal axes of the fuel pressure vessels 108 can be disposed on a common vertical plane. A line connecting the central longitudinal axes of the pressure vessels 108 can be transverse to, angled to or arcuate in relation to a vertical plane, e.g., following a contour of a curved surface of a vehicle.

As illustrated in FIG. 4, the fuel pressure vessels 108 can have a width that extends between lateral connectors 152, 156 and/or lateral sides of the fuel system frame assembly 104. In some embodiments, the fuel pressure vessels 108 can have a width that extends beyond the width of a tapered portion, e.g., of the forward tapered portion 113 of the cowling 112. The fuel pressure vessels 108 can have a width that extends abutting the interior of the forward portion and/or rearward portion of the cowling 112. The fuel pressure vessels 108 can have a width that extends less than a width of the third tapered portion 102C or the fourth tapered portion 102D of the cowling 112.

For example, in some embodiments, end portions of the fuel pressure vessel 108 can be disposed laterally inwards from each of the lateral connectors 152, 156 disposed on each side of the fuel system frame assembly 104. In some embodiments, the fuel pressure vessel 108 can be disposed at least partially within the rearward portion 118 and the forward portion 116 of the cowling 112. In some embodiments, the fuel pressure vessel 108 can have a width that is wider than the width permitted by the incline of the fourth tapered portion 102D. In such embodiments, the frame assembly 140 can confine the fuel pressure vessel 108 at least partially within the interior of the rearward portion 118 of the cowling 112. Some configurations of the fuel system frame assembly 104 can include a recessed portion that can allow the internal components to be at least partially inward of the lateral connectors 152, 156 on either side of the fuel system frame assembly 104.

Figure 3:
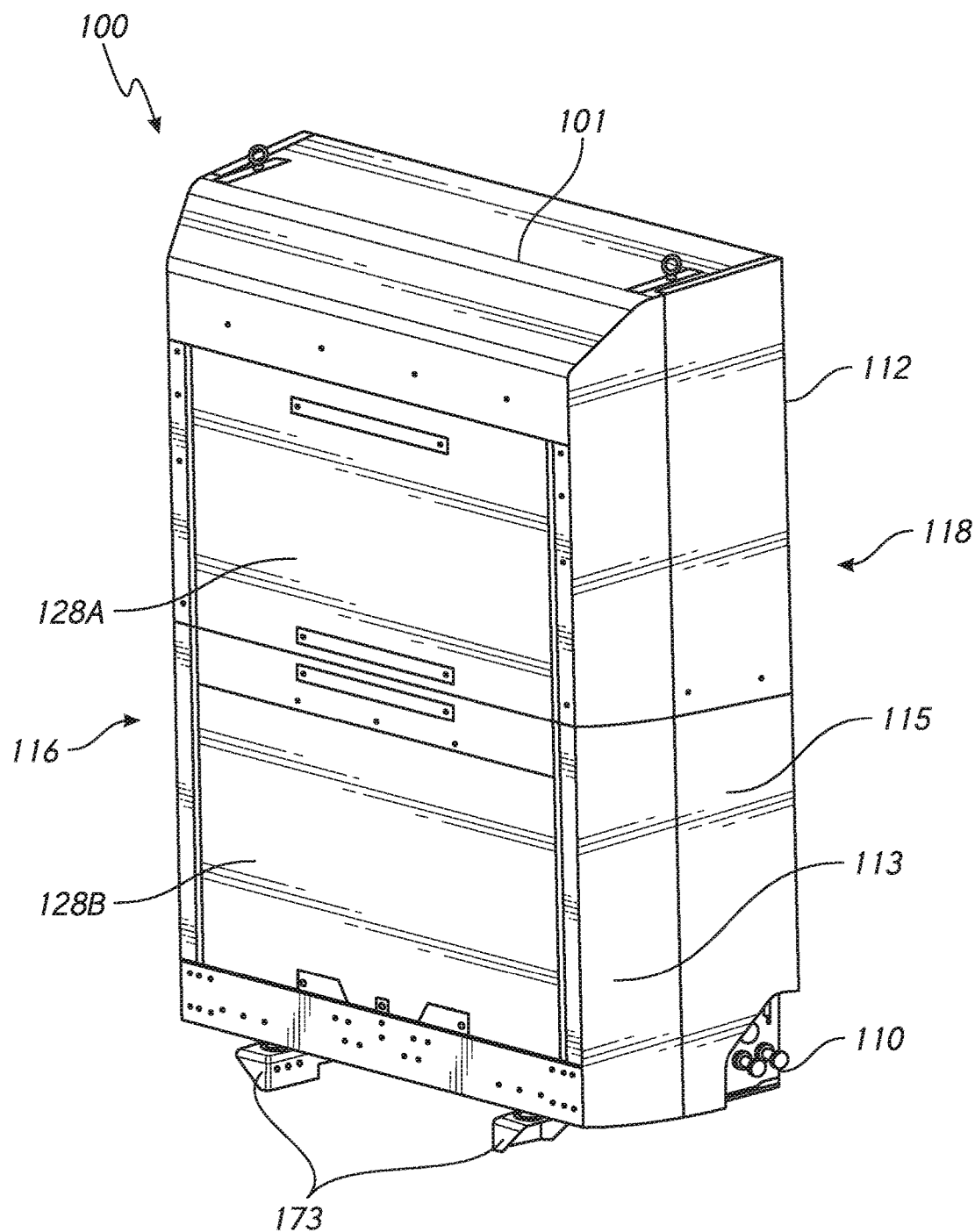
FIG. 3 is a front perspective view of an embodiment of a back-of-cab fuel system.

The fuel pressure vessels 108 can be accessed from the front of the forward portion 116 of the cowling 112 and/or lateral sides of the cowling 112. For example, FIG. 3 illustrates a configuration of the forward portion 116 of the cowling 112 having access panels for enabling user and maintenance access to the enclosed space therein. For example, one lateral side of the rearward portion 118 can have a plurality of access panels 110, e.g., an upper panel and a lower panel. In some embodiments, the front of the forward portion 116 can have a plurality of access panels. For example, the forward portion 116 can include a top panel 128A and a bottom panel 128B. The top panel 128A and the bottom panel 128B can be primarily for accessing the fuel pressure vessels 108. The access panels 128A, 128B also can provide access to controllers, fluid ports, and other features of the fluid system. In some embodiments, the lateral side of the rearward portion 118 can have access panels that provide access to an auxiliary fluid system including an auxiliary fluid vessel, controllers, fluid ports, and other features of the fluid system and/or fill up ports. Access to the fuel pressure vessel 108 coupled therewith through the panels 128A, 128B allows service of and/or a change in configuration of systems that are powered by the fuel pressure vessel 108.

The fuel system 100 can also have one or a plurality of handling members 132 accessible on an outside surface of the cowling 112. The handling members 132 can include one or a plurality of hooks or eye-bolts. The handling members 132 preferably are on a top side of the system 100, such that the system 100 can be suspended by cables or other tension members and lowered thereby into position. Other handling members 132 can be provided. The handling members 132 enable the fuel system 100 to be hoisted onto the frame rail 54 or removed therefrom for repair, reconditioning or replacement. For example, as discussed above, the fuel pressure vessel 108 is accessible through the panels 128A, 128B. By lifting the fuel system 100 using the handling members 132, the fuel pressure vessel 108 can be inspected, serviced and repaired. The handling members 132 are advantageous for applications where the fuel system 100 is retrofitted to the frame rail 54. The handling members 132 can be used in original assembly of the frame rail 54 as well.

A vehicle assembly is provided that includes a frame rail 54 and a cab 58, a fairing 70, and a fuel system 100. The vehicle assembly can have improved and more compact vehicle system arrangements. The frame rail 54 extends between a front axle and a rear axle of the vehicle assembly. The cab 58 is supported by the frame rail 54 and has a driver side, a passenger side, and a back wall at least partially enclosing an interior space of the cab 58. The fairing 70 is coupled with the cab 58. The fairing 70 has a rear portion disposed laterally of the passenger side and the driver side. The rear portion of the fairing 70 also is disposed above the top portion of the cab 58. The fairing 70 partially surrounds a tapered space disposed rearward of the back wall of the cab 58. The fuel system 100 has a fuel system frame 104, at least one fuel pressure vessel 108, and a cowling 112. The fuel system frame 104 has a bottom portion coupled with the frame rail 54 and an internal space extending away from the bottom portion toward a top portion. The at least one fuel pressure vessel 108 is at least partially disposed in the internal space and is supported by the fuel system frame 104.

Figure 5:
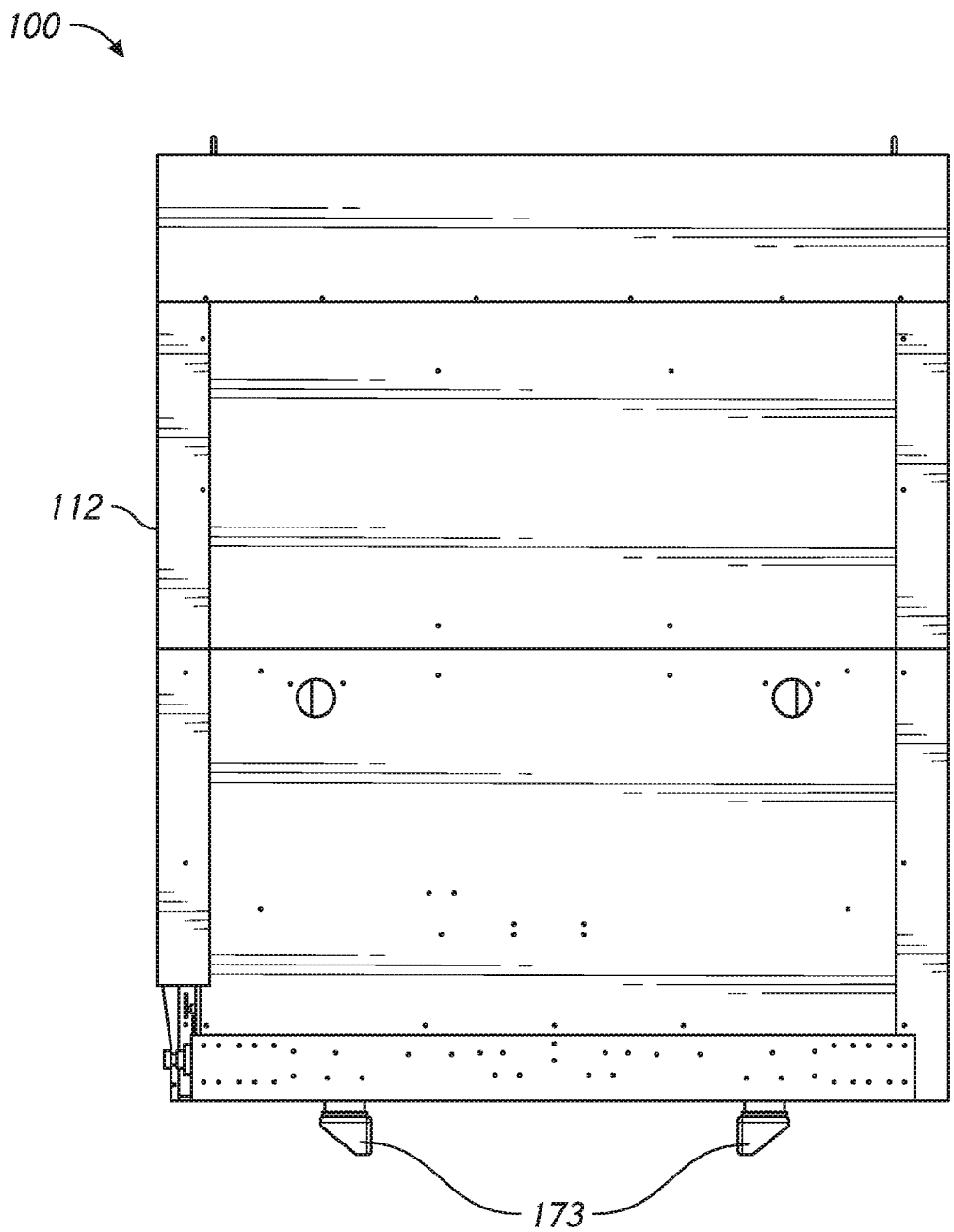
FIG. 5 is a rear view of the fuel system of FIG. 3.

The cowling 112 is disposed around the fuel system frame. The cowling 112 has a forward portion 116 and a rearward portion 118. FIG. 5 illustrates a rear view of the cowling 112. The cowling can have a tapered profile in a horizontal plane of the cowling. The tapered profile has a rearward taper and a forward taper. The forward taper extends between the rearward taper and a forward end of the tapered profile. The forward taper and at least a portion of the rearward taper are disposed in the tapered space.

Figure 8A:
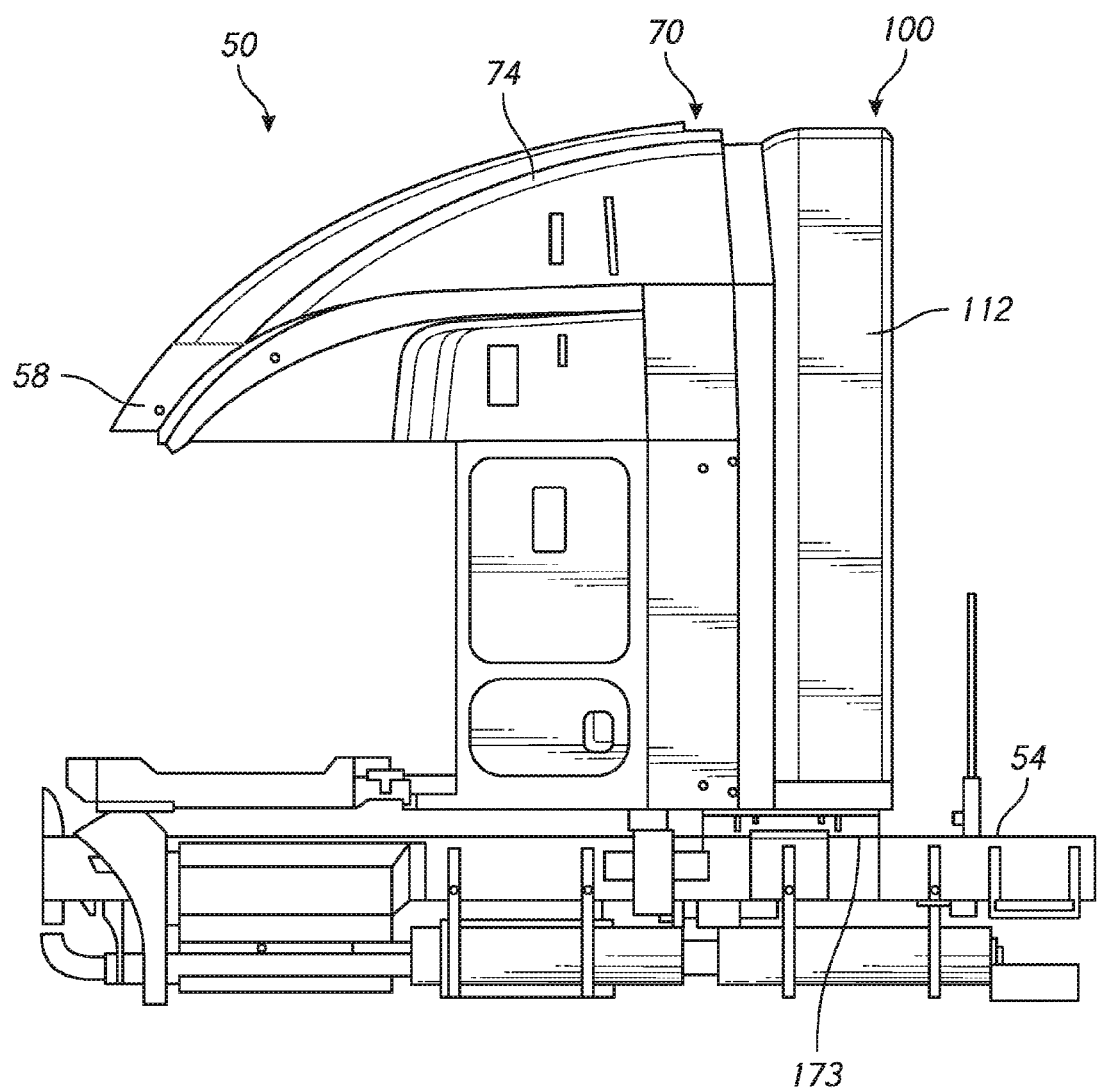
FIGS. 8A and 8B are similar to FIGS. 2A and 2B showing a vehicle assembly including the fuel system of FIGS. 3-7C.
Figure 8B:
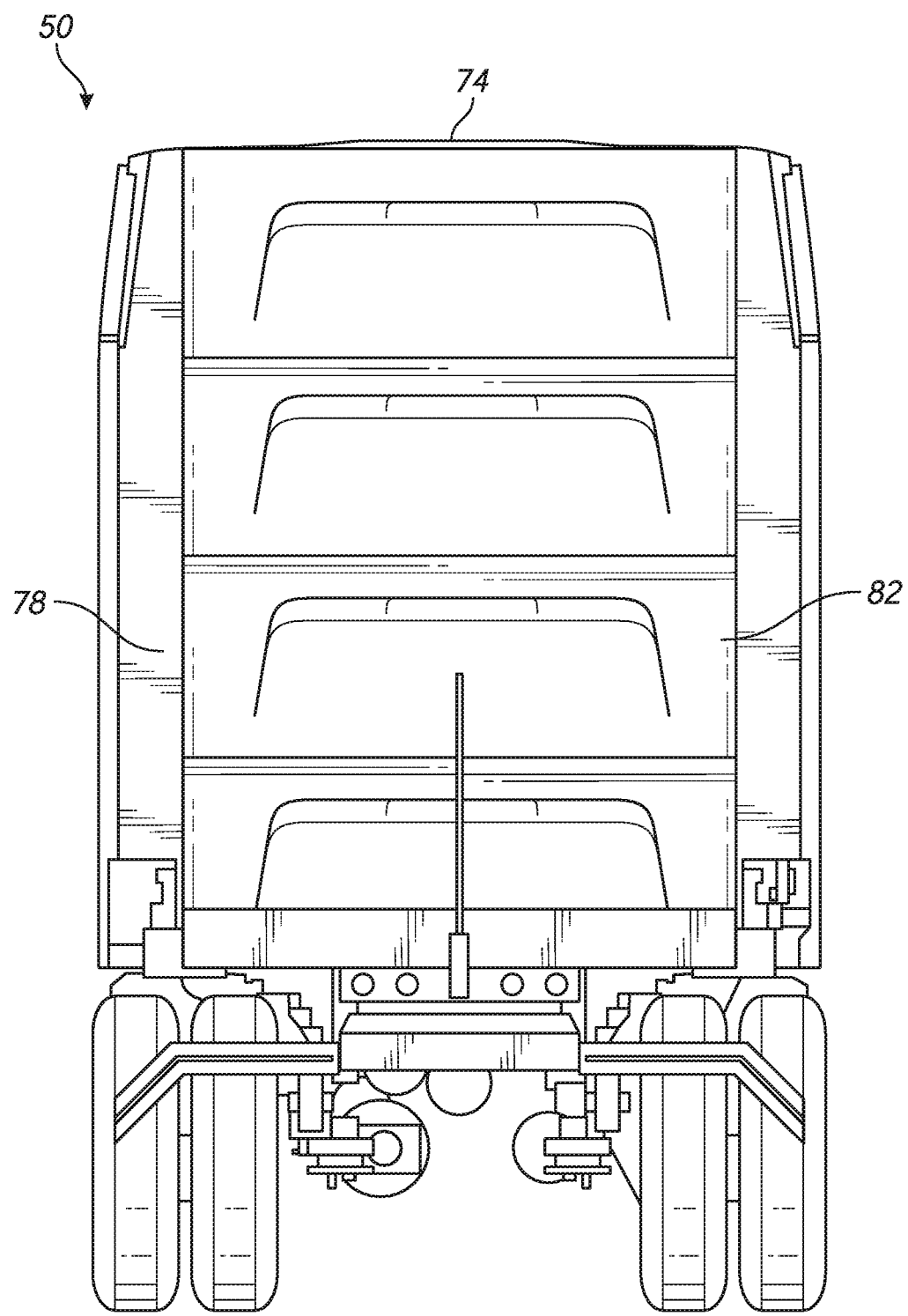

FIGS. 8A and 8B show an example embodiment of the vehicle assembly that includes a frame rail 54 and a cab 58 supported by the frame rail 54. The fuel system 100 is disposed rearward of or behind the cab 58. The fuel system 100 has a step-down tapered profile in that a cowling 112 thereof has a transverse perimeter that reduces in the forward direction with plurality angled faces and/or portions. An inflection line 101 can separate each of the plurality of angled faces and/or portions. For example, a first tapered portion 102A of the fuel system 100 can be substantially flat, a second tapered portion 102B can reduce at an incline in the forward direction, and a third tapered portion 102C can reduce at a steeper incline in the forward direction than the first tapered portion 102A.

FIGS. 8A and 8B illustrate a single-tapered cowling 112, however any cowling 112 configuration can be included, such as the cowling 112 illustrated in FIGS. 6 and 7C, for example. In some embodiments, the fuel system can include a single-tapered cowling 112. The single-tapered cowling 112 can be in the vicinity of the first frame. In such a configuration, the first frame 140 of the fuel system frame assembly 104 can be narrower towards the forward side to facilitate the single-tapered cowling 112 structure. The fuel system frame assembly 104 of the single-tapered cowling 112 can be configured to be further forward within the fuel system 100 along the frame rail 54. The fuel system frame assembly 104 of the single-tapered cowling 112 can enable the fuel system 100 to be more forward within the fairing 70 as illustrated by the distance between the rearward side of the cowling 112 and the rear end of the frame rail 54.

Some embodiments may include a dual-tapered system. The dual-tapered system can include a first tapered portion 102A and a second tapered portion 102B. In such configurations, the first tapered portion 102A can reduce at an incline in the forward direction and the second tapered portion 102B can reduce at a steeper incline in the forward direction than the first tapered portion 102A.

The stepped perimeter taper allows a forward portion to be receive to some extent into a tapered space surrounded by a fairing 70 to obtain efficiency of component arrangement and other advantages. For example, the fairing 70 can include multiple portions. In an example, a top fairing portion 74 can be coupled with a roof of the cab 58 can flare upward and rearward of the cab 58 in an aerodynamic manner. One or more side portions 78 can extend from a driver side of the cab 58. One or more side portions 82 can extend from a passenger side of the cab 58.

As discussed above, the dual-tapered system can achieve a better taper for efficiency of component arrangement and other purposes. For example, the fuel system 100 can be fitted further into the fairing 70 such that less volume and/or area of the fuel system 100 is exposed. As illustrated in FIGS. 8A and 8B, the cowling 112 and fuel system 100 can take up less space in a dual-tapered system in both width and depth. In particular, in FIG. 8A, the cowling 112 and fuel system 100 extend a shorter distance in the rearward direction as compared with the embodiment described in FIG. 2A. In FIG. 8B, for example, the cowling 112 and fuel system 100 has a smaller overall width than the embodiment shown in FIG. 2B.

FIG. 9A schematically illustrates an example embodiment of a vehicle assembly 50' comprising a cab 58, a fairing 70, and a fuel system 62. The fuel system 62 is disposed rearward of or behind the cab 58. The system 62 has a tapered profile in that the cowling 66 thereof has a transverse perimeter that reduces in the forward direction. The perimeter taper allows a forward portion to be received to some extent into a tapered space surrounded by the fairing 70. For example, as illustrated in FIG. 9A, the fuel system 62 can have a constantly tapered profile. The fuel frame assembly disposed within the fuel system 62 can have a first frame 86 and a second frame 90. In this configuration the first frame 86 and the second frame 90 can be substantially the same length and width. Accordingly, the fuel frame assembly 84 in this embodiment may be substantially rectangular. In this embodiment, the fairing 70 can accommodate the forward portion of the fuel system 62. In such an embodiment, empty space 94' can be disposed between the front portion of the fuel system 62 and the interior of the fairing 70. Accordingly, the frame rail 54 can extend into the empty space.

FIG. 9B schematically illustrates an example embodiment of the vehicle assembly 50 comprising a cab 58, a fairing 70, and a fuel system 100 that can be supported by the frame rail 54. In this embodiment, the fuel system 100 can comprise a dual-tapered cowling. As described above, the dual-tapered cowling can reduce the size of the fuel system 100 and reduce the length of the fuel system 100 that is exposed outside of the fairing 70 as compared with the example embodiment of FIG. 9A. In this configuration, the fuel frame assembly 104 can have a bottom portion coupled with the frame rail 54 and an internal space extending away from the bottom portion toward a top portion. The fuel frame assembly 104 can be narrower toward a forward portion thereof than adjacent to a rear portion thereof. As illustrated in FIG. 9B, the fuel frame assembly 104 is narrower towards the forward portion such that the frame assembly can fit into the fairing 70 to reduce the empty space 94 disposed between the forward portion of the fuel system 100 and the interior of the fairing 70. As illustrated in FIG. 9B, the empty space 94 can be smaller than the empty space 94' illustrated in FIG. 9A. In this embodiment, by reducing the amount of empty space, the length of the frame rail 54 can advantageously be reduced to increase aerodynamics, decrease weight, increase space efficiency, decrease turning radius, and/or increase DGE, for example.

In this embodiment, at least one fuel pressure vessel disposed within the fuel frame assembly 104 can be at least partially disposed in the internal space within the fairing 70 and supported by the fuel frame assembly 104. In some embodiments, a cowling 112 can be disposed around the fuel frame assembly 104 such that it encloses the fuel frame assembly 104. The cowling 112 can have a forward tapered portion 113 and a rearward tapered portion 115. The forward tapered portion 113 can be disposed in front of the rearward tapered portion 115. In this configuration, the forward tapered portion 113 and the rearward tapered portion 115 can be disposed in a horizontal plane of the cowling 112. As illustrated in FIG. 9B, the forward tapered portion 113 can be narrower than adjacent to the rearward tapered portion 115 such that it fits at least partially into the interior of the fairing 70.

A vehicle assembly including a dual-tapered system can have several advantages. For example, the dual-tapered system can be cheaper due to the decrease in material used and space saved in building the cowling 112 and fuel system 100. Since less material may be used and the overall system can be more compact, a shorter vehicle frame and/or frame rail may be used. This is advantageous because the fuel system 100 can be spaced more closely from the rear portion of the cab. For example, the length of the frame rail can decrease by 1 to 3, 3 to 6, 6 to 12, 12 to 18, 18 to 24, 24 to 30, and/or 30 to 36 or more inches. Similarly, the fuel system frame assembly disposed within the fuel system 100 can use less material and have an overall smaller size. In embodiments in which the size of the fuel system frame assembly 104 does not decrease, a greater number of components, for example fuel vessels, can be stored within the fuel system frame assembly 104. In the same manner, due to the decrease in material used in constructing the vehicle and various components thereof, the overall weight of the fuel system 100 and/or vehicle assembly can decrease. In some embodiments, the turning radius of a vehicle assembly implementing the dual-tapered system can be tighter and/or smaller. In such configurations, the vehicle assembly can have more DGE per inch of rail to advantageously store a larger amount of DGE, allowing the vehicle assembly to be used for longer periods of time without requiring the vehicle assembly to be stopped.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication.

What is claimed is:

1. A fuel system comprising:
a frame assembly disposed around an internal space and configured to be coupled with a vehicle frame rail, the frame assembly comprising a first frame having a first maximum width and a second frame having a second maximum width, the first frame being disposed forward of the second frame, the first maximum width being less than the second maximum width;
a fuel pressure vessel having a cylindrical portion extending between ends thereof and disposed along a longitudinal axis of the fuel pressure vessel, the cylindrical portion being disposed in the internal space of the frame assembly;
a cowling disposed around the frame assembly, the cowling having a cowling tapered width at the location of the first frame;
wherein the cowling tapered width is less than the second maximum width of the second frame of the frame assembly, and
wherein a horizontal plane intersecting the cowling comprises a profile comprising a first taper and a second taper, the first taper being disposed between the second taper and the front of the cowling.

2. The fuel system of claim 1, wherein the fuel pressure vessel comprises a neck portion disposed at the end of the cylindrical portion, the neck portion extending over and supported by a lateral portion of the frame assembly.

3. The fuel system of claim 2, wherein the frame assembly comprises a connector comprising a first end coupled with the first frame and a second end coupled with the second frame, the connector disposed beneath and coupled with the neck portion of the fuel pressure vessel to support the neck portion of the fuel pressure vessel.

4. The fuel system of claim 3, comprising a support block disposed around the neck portion of the fuel pressure vessel, the support block connected to the connector.

5. The fuel system of claim 1, wherein the first frame comprises an assembly comprising a plurality of L-brackets comprising a concave portion that faces an interior space of the frame assembly.

6. The fuel system of claim 5, wherein the assembly of the first frame comprises a transverse connector configured to support the assembly disposed within the concave portion of one of the plurality of L-brackets.

7. The fuel system of claim 1, wherein the second frame comprises an assembly comprising a plurality of L-brackets comprising a concave portion that faces away from an interior space of the frame assembly.

8. The fuel system of claim 1, wherein the frame assembly further comprises a first lateral connector, a second lateral connector, and a fuel pressure vessel neck support, wherein the fuel pressure vessel neck support is coupled with the first lateral connector and the second lateral connector.

9. The fuel system of claim 1, wherein the first taper includes a first taper angle and the second taper includes a second taper angle, and wherein the first taper angle is greater than the second taper angle.

10. The fuel system of claim 1, wherein a side of the cowling includes a smooth transition between the first taper and the second taper.

11. A vehicle assembly comprising:
a fuel system comprising:
a fuel system frame assembly comprising:
a first frame having a first maximum width;
a second frame having a second maximum width greater than the first maximum width, the second frame disposed rearward of the first frame:
a first connector having a forward end coupled with the first frame and a rearward end coupled with the second frame;
a second connector having a forward end coupled with the first frame and a rearward end coupled with the second frame, the first and second connectors being disposed on opposite lateral sides of the fuel system frame assembly;
an internal space disposed between the first frame and the second frame and between the first connector and the second connector, the internal space sized to house a cylindrical portion of a vehicle fuel pressure vessel; and a fuel pressure vessel neck support coupled with each of the first connector and the second connector, wherein the fuel system frame assembly is configured to be mounted to a vehicle frame rail of a tractor unit behind a cab of the tractor unit a fuel pressure vessel having a cylindrical portion disposed in the internal space of the fuel system frame assembly; and a cowling disposed around the fuel pressure vessel and the fuel system frame assembly; and a truck tractor unit comprising a frame rail by which the fuel system is supported, a cab having a back wall at least partially surrounding a driver compartment, and a fairing coupled with the cab, the fairing surrounding a tapered space which matches a tapered shape of the cowling.

12. The vehicle assembly of claim 11, wherein separation between a back wall of the cab and a front wall of the cowling is less than a separation of a rear end of the fairing and the front wall of the cowling.

13. A fuel system comprising:
a frame assembly disposed around an internal space and configured to be coupled with a vehicle frame rail, the frame assembly comprising:
   a first frame having a first maximum width;
   a second frame having a second maximum width;
   a first lateral connector;
   a second lateral connector; and
   a fuel pressure vessel neck support,
   wherein the first frame is disposed forward of the second frame,
   wherein the first maximum width is less than the second maxim width, and
   wherein the fuel pressure vessel neck support is coupled with the first lateral connector and the second lateral connector;
a fuel pressure vessel having a cylindrical portion extending between ends thereof and disposed along a longitudinal axis of the fuel pressure vessel, the cylindrical portion being disposed in the internal space of the frame assembly;
a cowling disposed around the frame assembly, the cowling having a cowling tapered width at the location of the first frame;
wherein the cowling tapered width is less than the second maximum width of the second frame of the frame assembly.

* * * * *

UNITED STATES PATENT AND TRADEMARK OFFICE
CERTIFICATE OF CORRECTION

PATENT NO. : 9,914,355 B2
APPLICATION NO. : 15/499621
DATED : March 13, 2018
INVENTOR(S) : Todd F. Sloan It is certified that error appears in the above-identified patent and that said Letters Patent is hereby corrected as shown below:

At Column 14, Line 57, in Claim 11, change "frame:" to --frame;--.

At Column 16, Line 13 (approx.), in Claim 13, change "maxim" to --maximum--.

Signed and Sealed this
Twenty-sixth Day of June, 2018

Andrei Iancu
*Director of the United States Patent and Trademark Office*